United States Patent [19]

Chang et al.

[11] Patent Number: 4,901,257
[45] Date of Patent: Feb. 13, 1990

[54] TEMPERATURE CALIBRATION SYSTEM

[75] Inventors: Daniel Y. Chang, Canoga Park; Bradley C. Waldron, Woodland Hills; James M. Walthers, Sr., Chatsworth, all of Calif.

[73] Assignee: King Nutronics Corporation, Woodland Hills, Calif.

[21] Appl. No.: 61,297

[22] Filed: Jun. 12, 1987

[51] Int. Cl.⁴ .................. G06F 15/20; G01K 7/16
[52] U.S. Cl. .................. 364/571.01; 364/571.02; 364/571.03; 364/557; 374/172; 324/714; 73/1 R; 73/766
[58] Field of Search ............ 364/557, 571, 577, 573, 364/571.02, 571.03, 571.01; 374/1, 168, 171–172; 324/63; 73/721, 725, 766, 862.63, 1 R

[56] References Cited

U.S. PATENT DOCUMENTS

| | | | |
|---|---|---|---|
| 3,738,174 | 6/1973 | Waldron | 374/1 |
| 4,075,882 | 2/1978 | Waldron | 374/1 |
| 4,437,164 | 3/1984 | Branch, III | 364/557 |
| 4,528,637 | 7/1985 | Smith | 374/1 |
| 4,601,004 | 7/1986 | Holt et al. | 364/571.03 |
| 4,715,003 | 12/1987 | Keller et al. | 364/571 |

Primary Examiner—Parshotam S. Lall
Assistant Examiner—Ellis B. Ramirez
Attorney, Agent, or Firm—Harris, Kern, Wallen & Tinsley

[57] ABSTRACT

Method and apparatus for calibrating a temperature measuring device by operating a heat source at a preset temperature as determined by a temperature sensing resistor and a digitally calculated temperature which varies nonlinearly with the resistance of the resistor, and obtaining the coefficients for the calculation by operating the device at a preset temperature and comparing this temperature with that of a standard temperature measuring device.

12 Claims, 15 Drawing Sheets

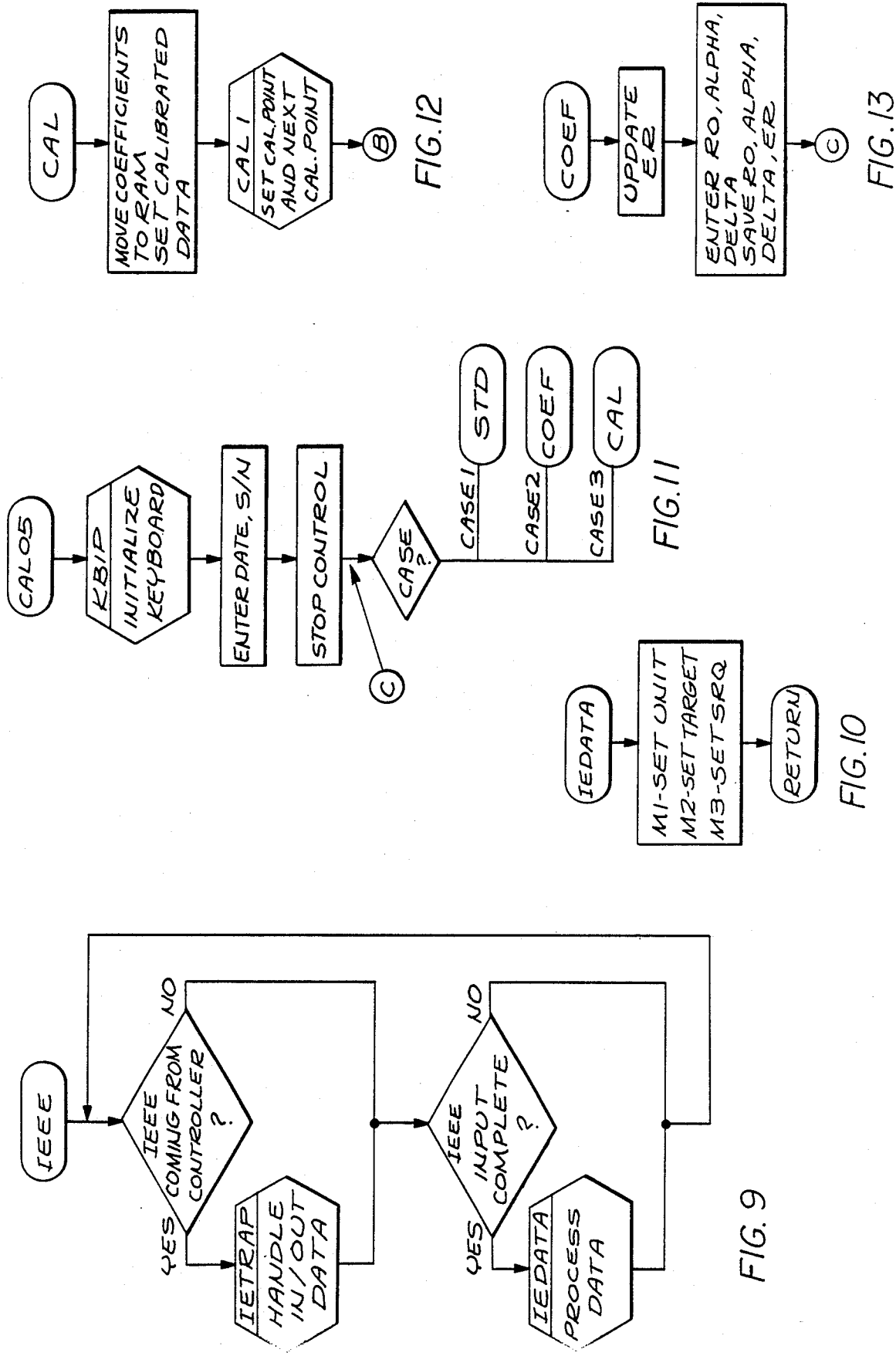

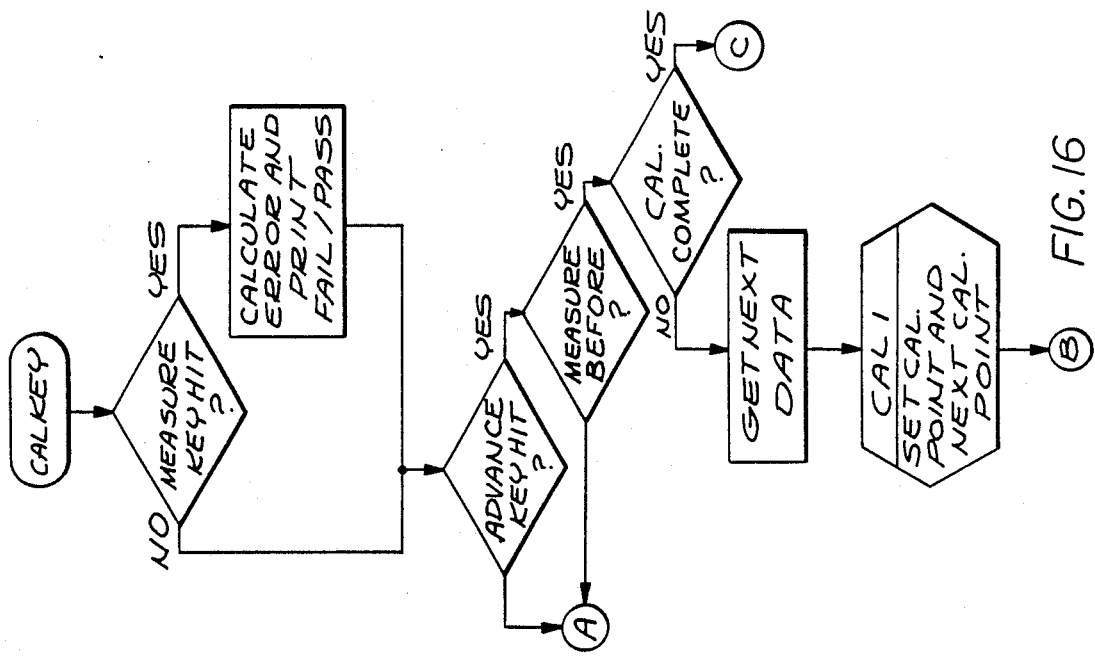
FIG. 16
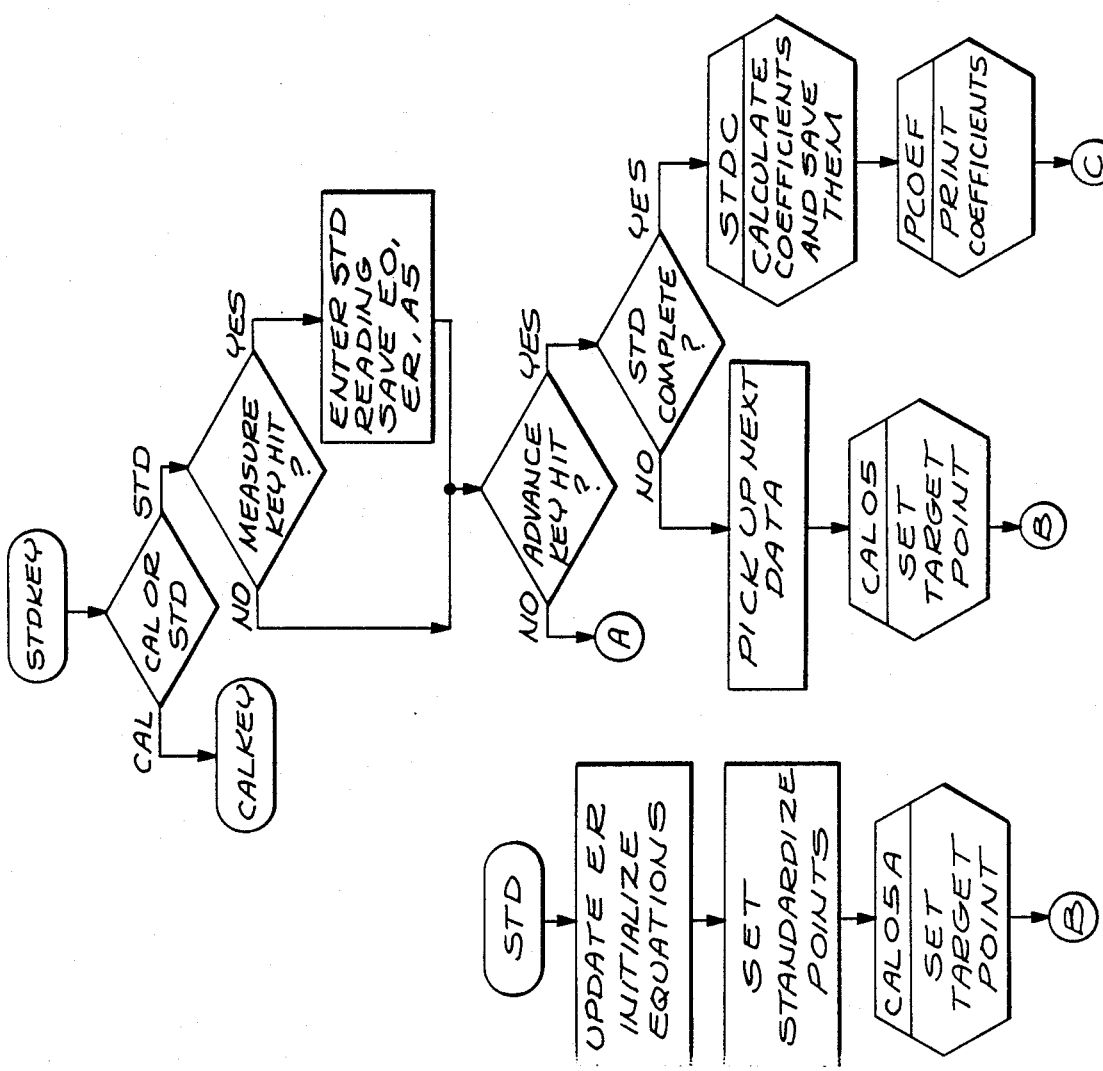
FIG. 15
FIG. 14

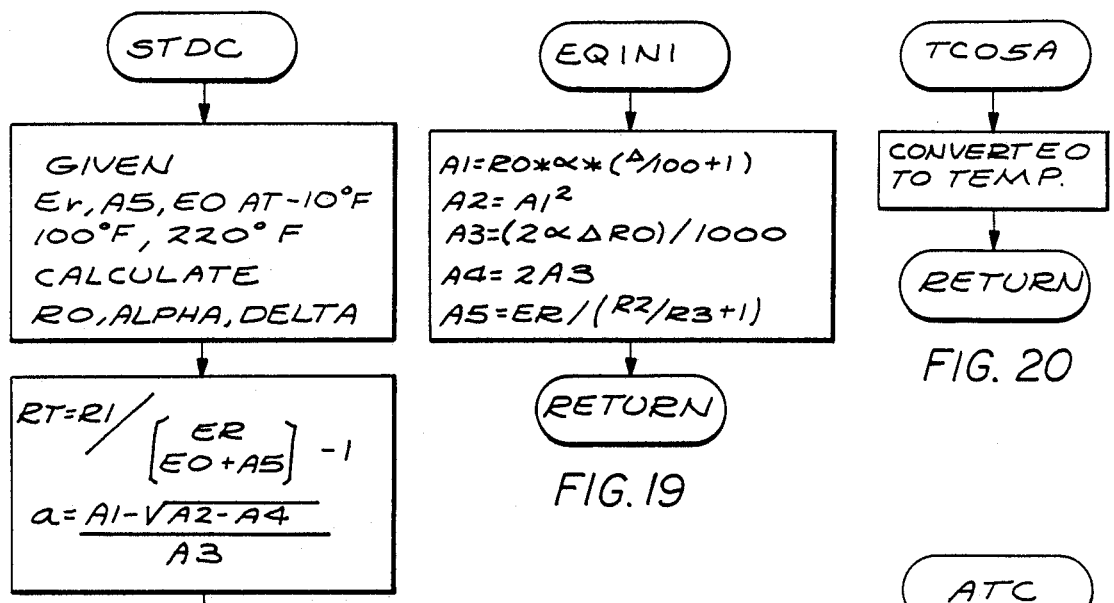
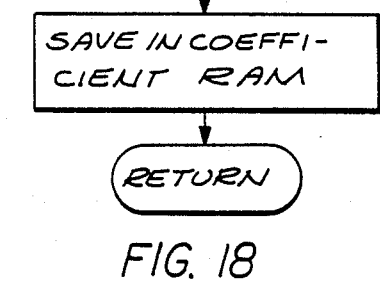
FIG. 18
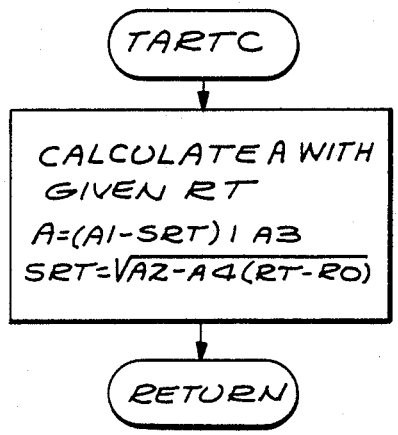
FIG. 21
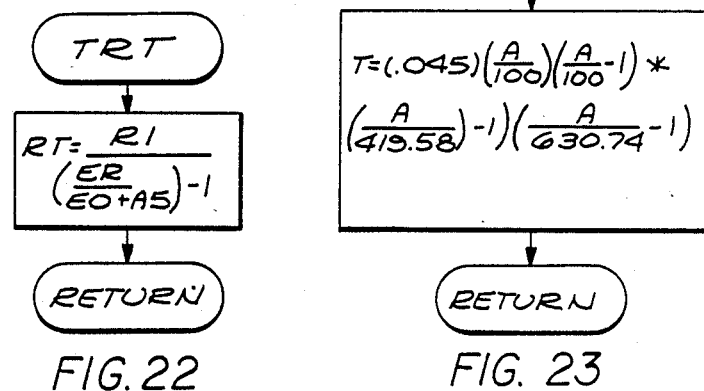
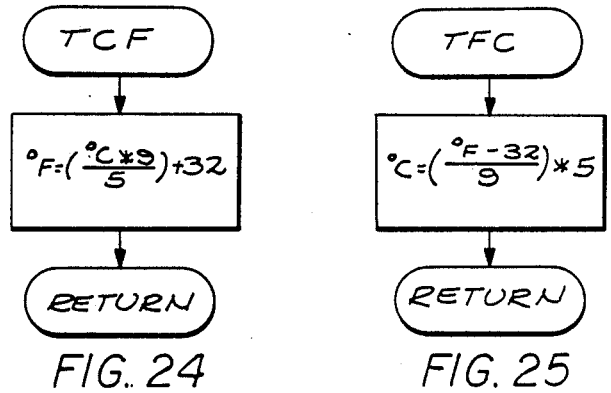

TEMPERATURE CALIBRATION SYSTEM

BACKGROUND OF THE INVENTION

This invention relates to dry well temperature test systems and to systems especially designed to be portable for easy use on site in testing and calibration of various temperature sensing devices, such as thermocouples, thermal switches, thermistors, thermometers, temperature control systems, and temperature indicators. A series of prior art temperature calibration systems are shown in U.S. Pat. Nos. 3,699,800; 3,738,174; 3,939,687; 4,075,882; and 4,079,618.

The prior art devices include an electrically heated, dry temperature well for receiving the probe or other temperature sensing device which is to be tested or calibrated. The devices also include some means for setting the desired temperature, a control circuit for controlling the input to the heat source in the temperature well in order to obtain the desired temperature, and some means for indicating the temperature of the heat source at the well.

The earlier of the above-identified devices operated only at temperatures higher than ambient. The two most recent of the U.S. Pat. Nos. 4,075,882 and 4,079,618, disclose a system utilizing a heat source which can operate at temperatures below ambient as well as above ambient. The invention of the present application is designed for use with such a heat source that can operate both below and above ambient, with the heat source providing for cooling below ambient temperature as well as heating above ambient temperature.

The prior art systems have all been analog in nature. A temperature sensing resistor is mounted in the heat source and is connected in a bridge circuit to provide a voltage signal which varies with the temperature of the heat source. This voltage signal is then utilized directly in controlling the power and the polarity of the power to the heat source for controlling the temperature of the heat source. A variety of problems are encountered in the analog circuits, including stability, determination of actual temperature from the resistance of the temperature sensing resistor which is nonlinear with temperature, calibration of the system itself by comparison with a standard temperature measuring device, and the expertise required of the operator in aligning the system.

SUMMARY OF THE INVENTION

A method and apparatus for calibrating a temperature measuring device, and for internally calibrating the apparatus with reference to an external temperature standard. A method and apparatus which provides an indication of a desired or set temperature and the actual temperature of the heat source and the difference between the set temperature and actual temperature, for calibration of an external instrument, and which indicates the difference between the actual temperature of the heat source and the temperature indicated by a standard positioned in the heat source, for calibration of the apparatus itself.

A digital method and apparatus which compensates for nonlinearity of a temperature sensing resistor by automatically fitting the curve of the resistance versus temperature characteristic of the temperature sensing resistor in the digital calculation of resistor temperature. A method and apparatus which automatically calculates the coefficients for the curve fitting equations obtained when comparing the actual heat source temperature of the well with that indicated by a standard temperature measuring device positioned in the well.

A method and apparatus which operates in a normal mode and a calibration mode, and which can be manually selected for these two modes, and which operates in a calibrate phase, a standardize phase, and a coefficient entry phase, and which can be selected for operation in the three phases. A method and apparatus which provides for self check of circuitry when in the normal mode and which provides for automatic calibration checking with an external standard when in the calibration phase. A method and apparatus which utilizes a microprocessor for calculation and control and which can incorporate a digital printer, a digital display, and a digital keypad input, all interconnected with a digital data bus, and which can be operated internally or through an IEEE bus for external control and/or transmission.

Other advantages, features, objects and results will more fully appear in the course of the following description.

BRIEF DESCRIPTION OF THE DRAWINGS

FIGS. 4–30 are subroutine flow charts setting out the operating procedure for the instrument shown in FIGS. 1–3.

DESCRIPTION OF THE PREFERRED EMBODIMENT

The instrument of the invention is a portable temperature probe calibrator. The instrument includes a temperature well which holds the probe to be calibrated, a control system which maintains the well at an accurate and preset temperature, an indicator for displaying information to the operator, a printer which can be used to provide a permanent copy of calibration data, and the controls and circuitry for operating the instrument in its normal and calibrate modes.

Figure 2:
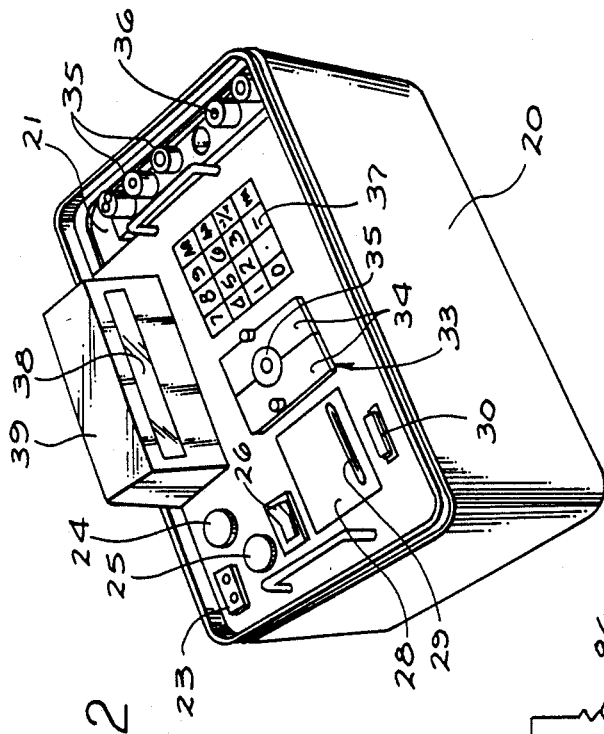
FIG. 2 is a perspective view of a portable dry well temperature test system incorporating the embodiment of FIGS. 1A and 1B.

The instrument as shown in FIG. 2 is similar in many respects to those shown in applicants aforementioned prior patents, particularly U.S. Pat. Nos. 4,075,882 and 4,079,618, and reference may be had to applicants prior patents for details of construction and operation of various components, particularly the temperature well, heat sink and thermo-electric module installation.

The instrument includes a housing 20 with the cover removed. A panel 21 is carried within the housing and supports the components of the system within the housing. Louvers (not shown) are provided in the rear wall of the housing to provide for air flow through the interior, preferably provided by a motor driven fan 22. Some of the components referred to in this description are not shown in FIG. 2, but are shown in the block diagram FIG. 1.

The various controls for the system are mounted on the panel 21. Electrical power is provided through a power receptacle 23, with a well power supply fuse 24 and an electronics fuse 25 connected in circuit with an off-on power switch 26.

A printer 27 is mounted under an access plate 28, with the printer paper being fed out through a slot 29, and with a push button 30 for advancing printer paper.

A temperature well 33 is also mounted in the panel, and may have a cover of the type shown in applicants U.S. Pat. No. 3,738,174. Hinged cover members 34 may be opened for insertion and removal of a metal sleeve or chuck 35. Typically a plurality of chucks are provided with the instrument, with each chuck having an opening 36 for insertion and removal of a temperature probe or other item which is to be tested or calibrated. The various chucks have a different shape, size and/or number of openings.

A numeric key pad 37 and a digital display panel 38 are also carried on the panel 21. The display panel 38 is mounted in a small housing 39. An electrical connector 40 for connecting the instrument to an IEEE bus, and a normal calibration mode switch 41 are mounted on the rear of the housing 39 for access when the main housing cover is removed.

Figure 1A:
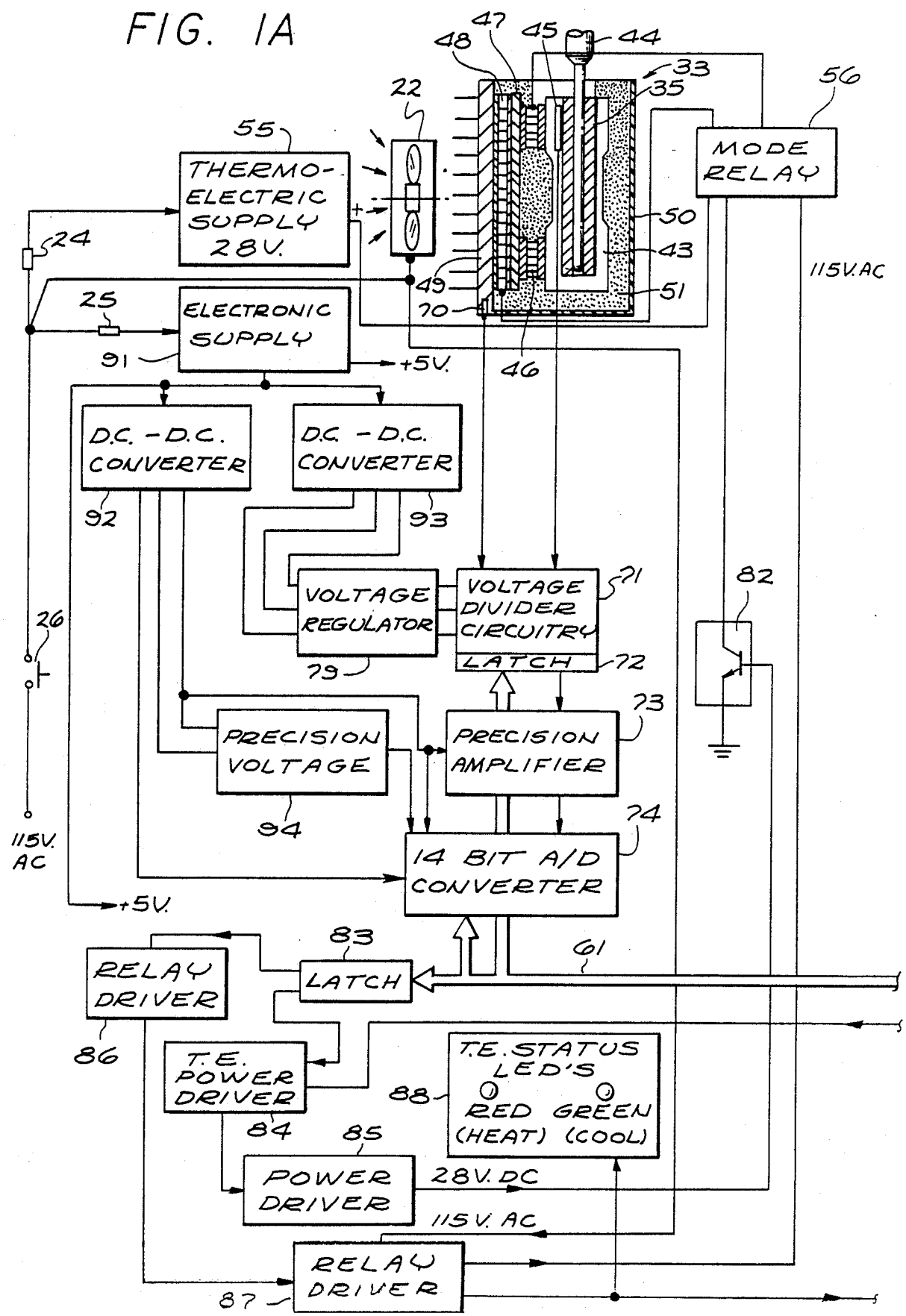
FIGS. 1A and 1B comprise a block diagram of a temperature calibration system incorporating the presently preferred embodiment of the invention.
Figure 1B:
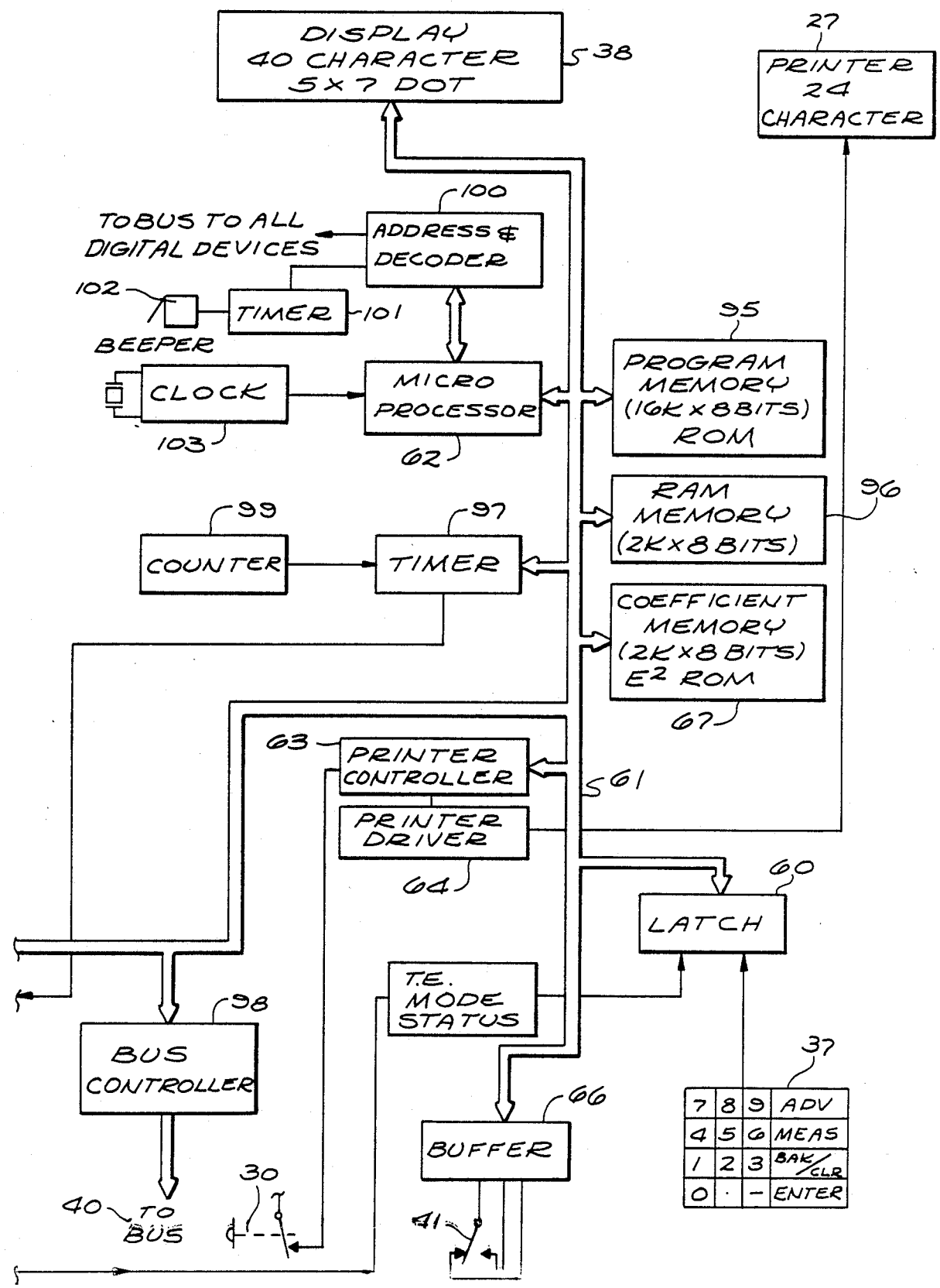

The temperature well 33 is shown in greater detail in FIG. 1 as well as in the aforementioned U.S. Pat. Nos. 4,075,882 and 4,079,618, and the construction and operation of the temperature well in the instrument of the present application is the same as that in said prior patents.

Referring to the temperature well 33 and FIG. 1, each of the chucks 35 is designed to be a sliding fit in a heat sink 43, with the probe 44 or other device being tested sliding into the chuck. A temperature sensing resistor 45 is mounted in the heat sink 43 and typically is a platinum resistor. Heating and cooling of the heat sink 43 is achieved by a plurality of thermo-electric modules, such as Borg-Warner P/N940-31. Modules 46 are mounted between the heat sink 41 and a metal plate 47, and modules 48 are mounted between the plate 47 and another heat sink 49 which preferably has a plurality of radiating fins. The heat sink 43 and modules 46, 48 are enclosed in a cover 50, which preferably is filled with a thermal insulating material 51.

The thermo-electric modules are connected together electrically with the same polarity, preferably in series, and are energized from a thermo-electric switching supply 55 and a mode relay 56. The mode relay provides for selecting between heating and cooling operation, and the switching supply 55 turns the module power on and off. When it is desired to raise the temperature of the heat sink 43 above ambient, the group of modules is connected to a DC power source with one polarity, and when it is desired to lower the temperature of the heat sink below ambient, the group of modules is connected to a source with the opposite polarity by the mode relay.

A thermo-electric module develops a difference in temperature between its inner and outer plates when a current is passed through its internal series of thermocouple-like junctions. Modules presently available are capable of developing a temperature differential between the two plates of a module of approximately 85° F. The specific embodiment of the instrument disclosed herein is required to be able to calibrate thermometers at temperatures 100° F. below the ambient temperature in which the instrument is operating. Therefore two stages of modules connected in thermal series are utilized. The module stage 48 is coupled to the heat sink 49 which is held close to room ambient temperature by the fan 22. The module stage 46 is coupled to the module stage 48 and to the heat sink 43 in which one of the chucks 35 is inserted. When operating at full power, the two module stages can easily cool the chuck and test probe 44 to 100° below the operating ambient temperature.

When the polarity of the current through the modules is reversed, the outer plates of the modules become cold with respect to the inner plates and the heat sink 43 is heated. Under these conditions, the specific embodiment illustrated can raise the temperature of the chuck and probe to 250° F., with less power than is required to cool the components to −25° F.

The numeric key pad or keyboard 37 is a 16 function touch panel, and is used by the operator to enter temperature test points and other data, and commands. The keyboard has the numbers 0 to 9 and the instructions ADVANCE, MEASURE, BACK/CLEAR, dot, dash, and ENTER. The keyboard provides an output in binary code through a latch 60 to the data bus 61.

The display 38 may be a conventional component and typically is a forty character, five by seven dot matrix, vacuum fluorescent tube, with its own microprocessor for operation. Input to the display is provided from a system microprocessor 62 in a ASCII code via the data bus 61.

The printer 27 may be a conventional device and in the embodiment illustrated is a five by seven dot matrix impact printer. The printer is controlled by its own printer controller or microprocessor 63 via a printer driver 64. The printer controller 63 receives the character code from the main microprocessor 62 via the data bus 61 and furnishes the dot format required by the printer to form the character and space and feed the character in the proper location on printed copy. The paper feed switch or push button 30 permits the operator to advance the paper in the printer.

The mode switch 41 is connected to the processor 62 through a buffer 66 and serves to set the processor in the normal mode for operation in temperature setting and in the calibrate mode for aligning the instrument. When in the calibrate mode the switch 41 also enables the coefficient memory 67, and disables the coefficient memory when in the normal mode. Preferably, the calibration switch is positioned in a recessed opening which can be closed with a calibration sticker when calibration of the instrument has been completed. Then the calibration sticker has to be broken or removed in order to again switch the instrument from normal mode to calibrate mode for recalibration.

In addition to the sensing resistor 45 mounted in the heat sink 43, another temperature sensing resistor 70 is mounted in the heat sink 49 to provide a measure of ambient temperature. Preferably, these two components are platinum resistors. The two resistors 45, 70 are connected as inputs to voltage divider circuitry 71 with its output connected to the data bus 61 through a latch 72, a precision amplifier 73, and an analog to digital converter 74. The voltage divider circuitry is shown in greater detail in FIG. 3.

Figure 3:
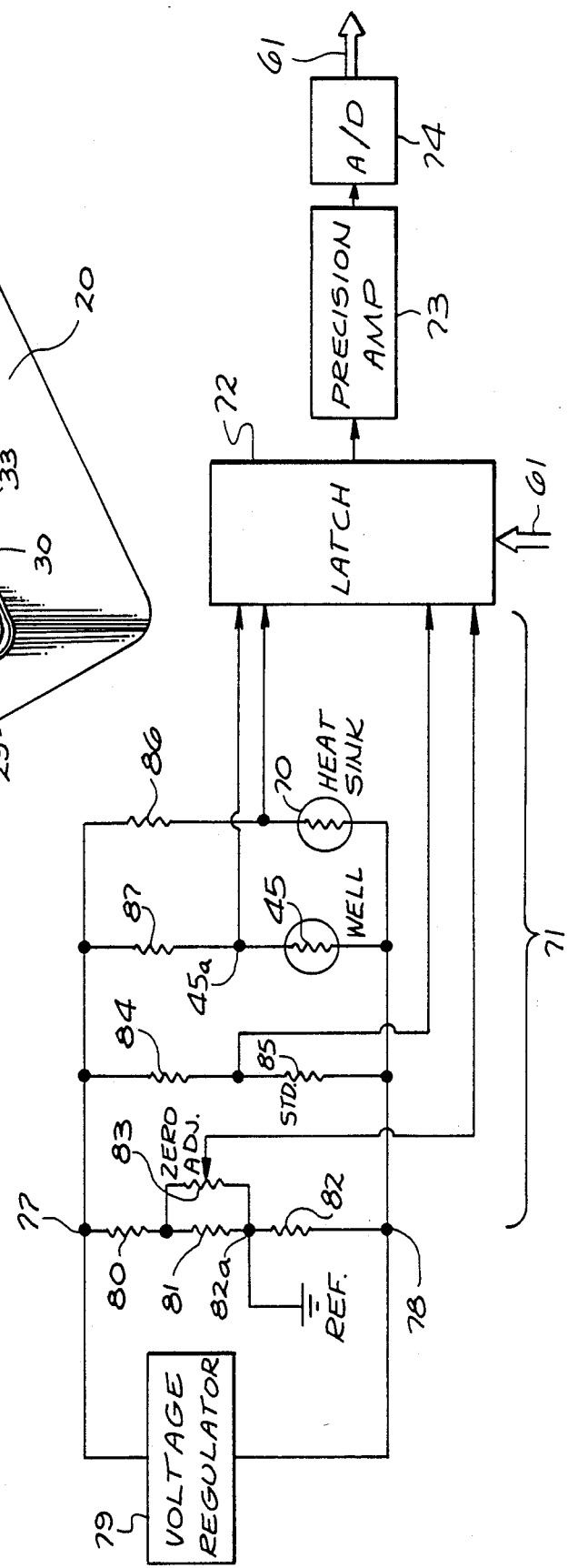
FIG. 3 is an electrical schematic of the bridge circuit of the embodiment of FIG. 1.
Figure 6:
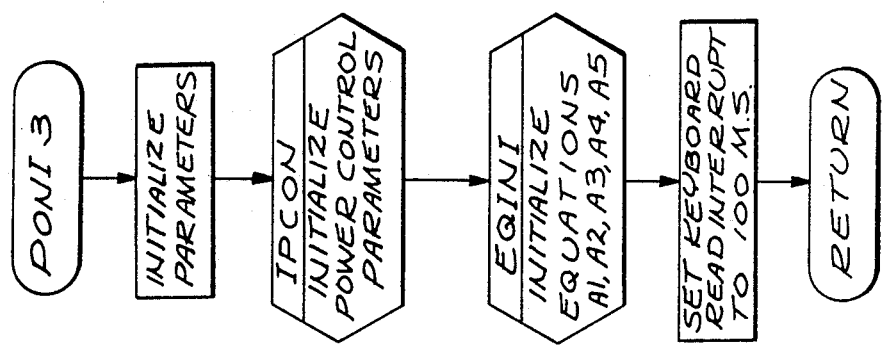
Figure 5:
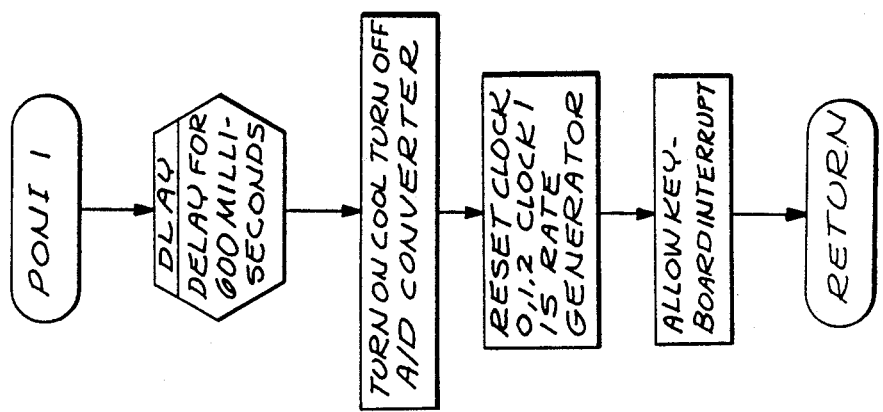
Figure 4:
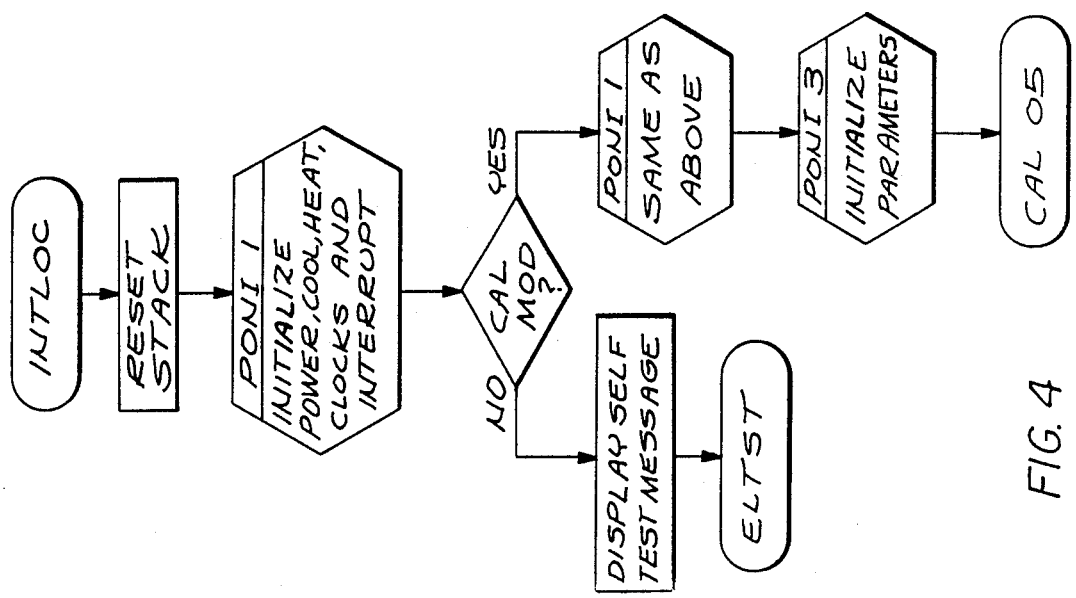
Figure 7:
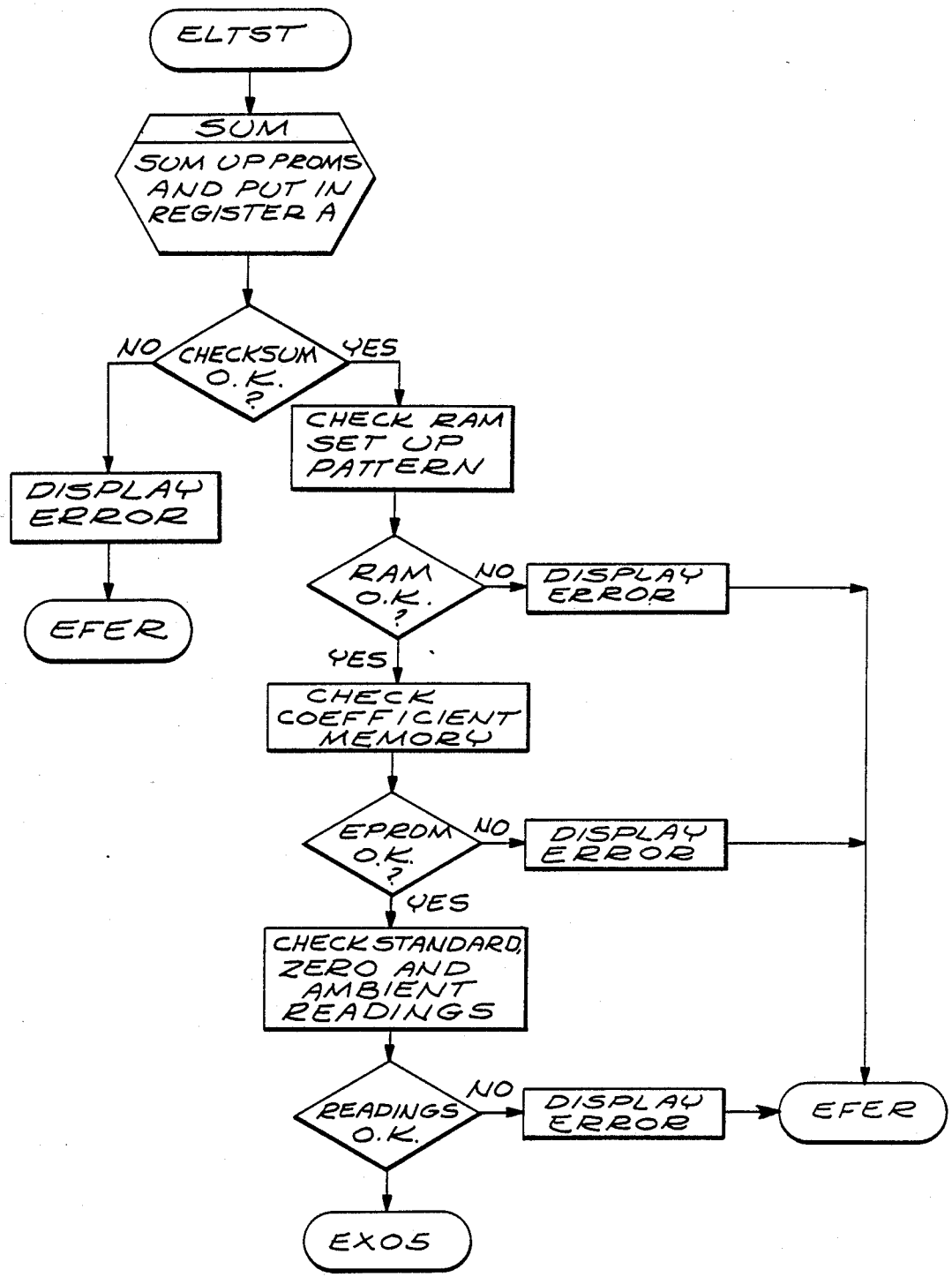
Figure 8A:
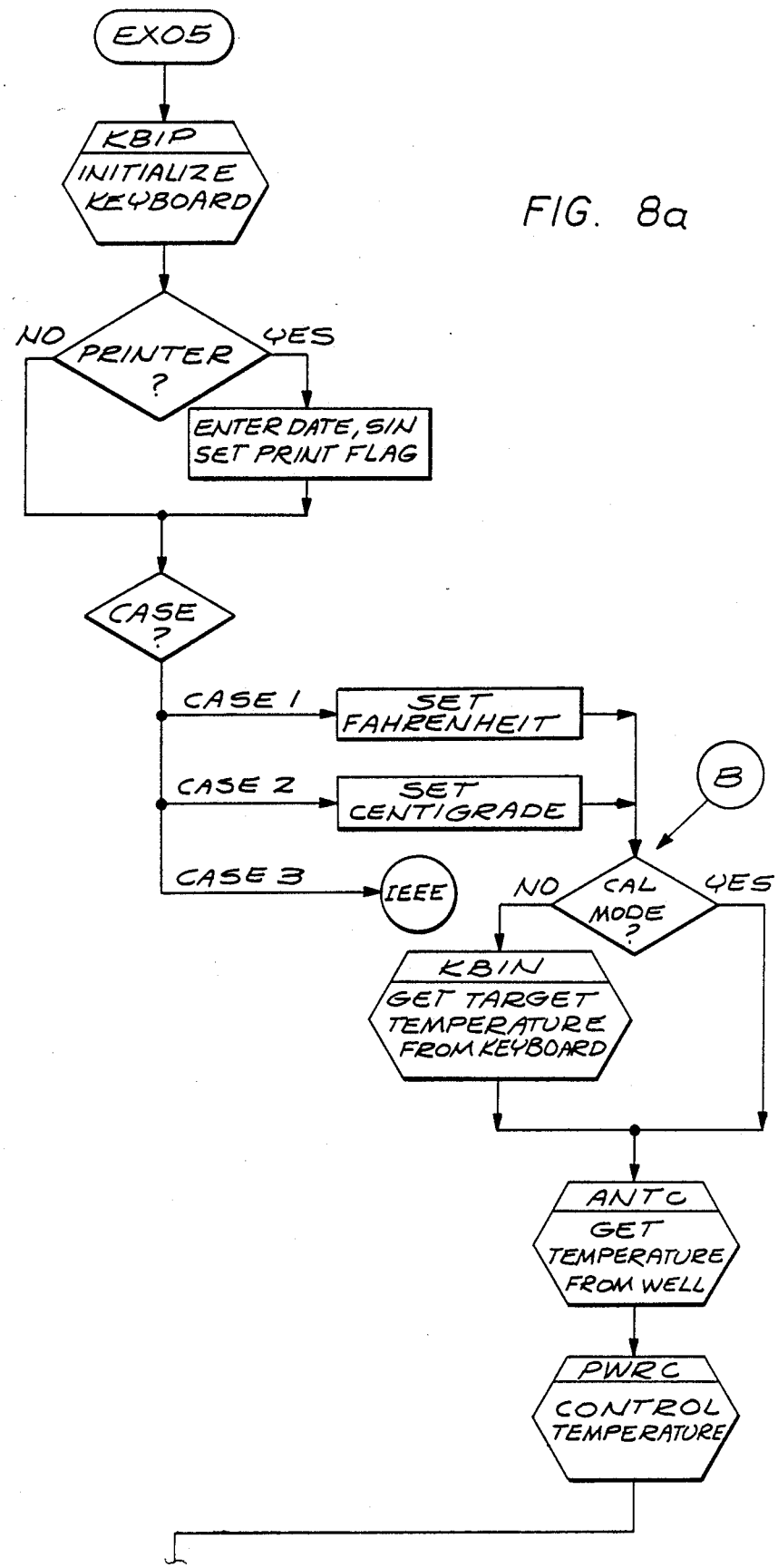
Figure 8B:
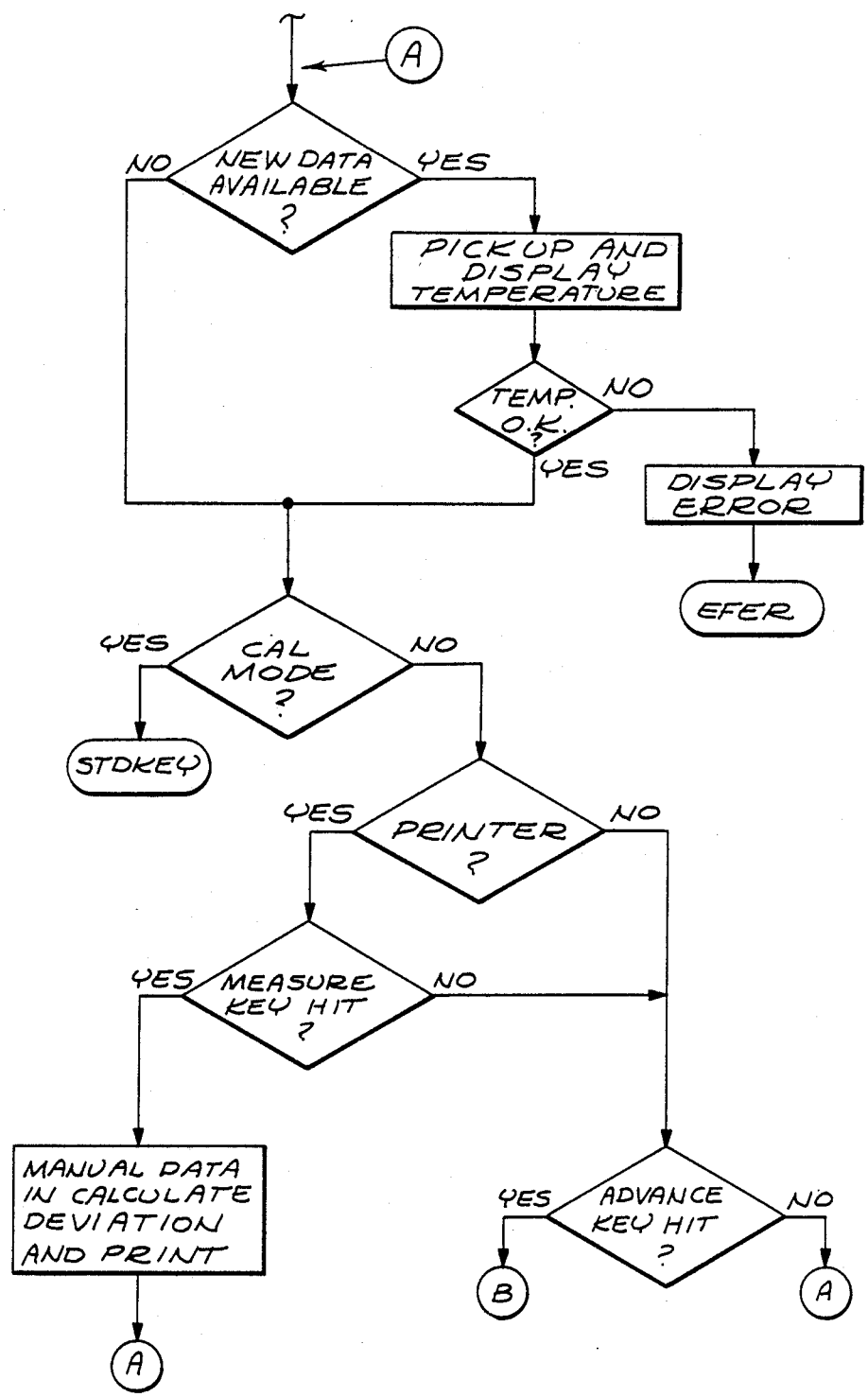
Figure 17:
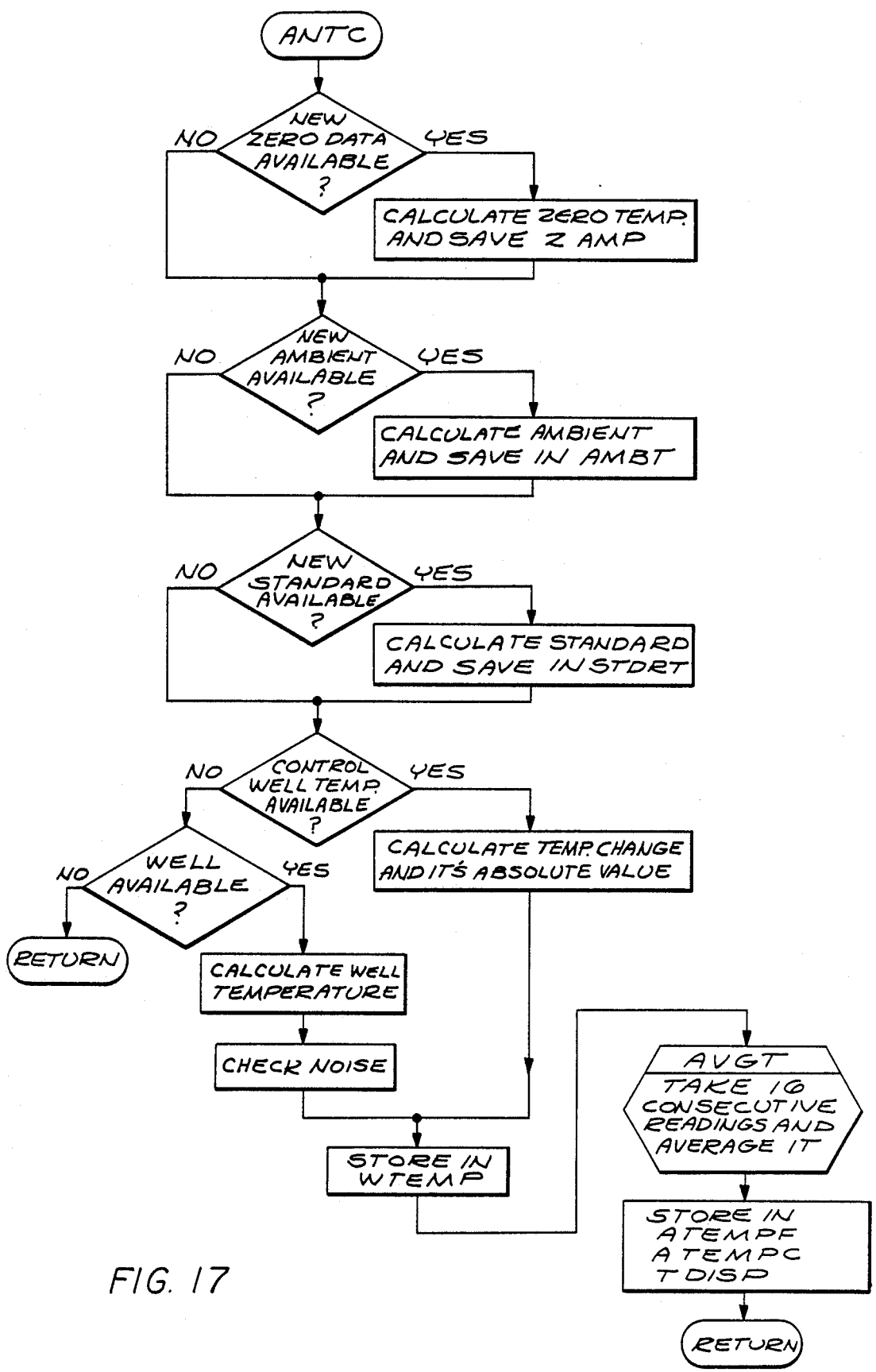
Figure 26A:
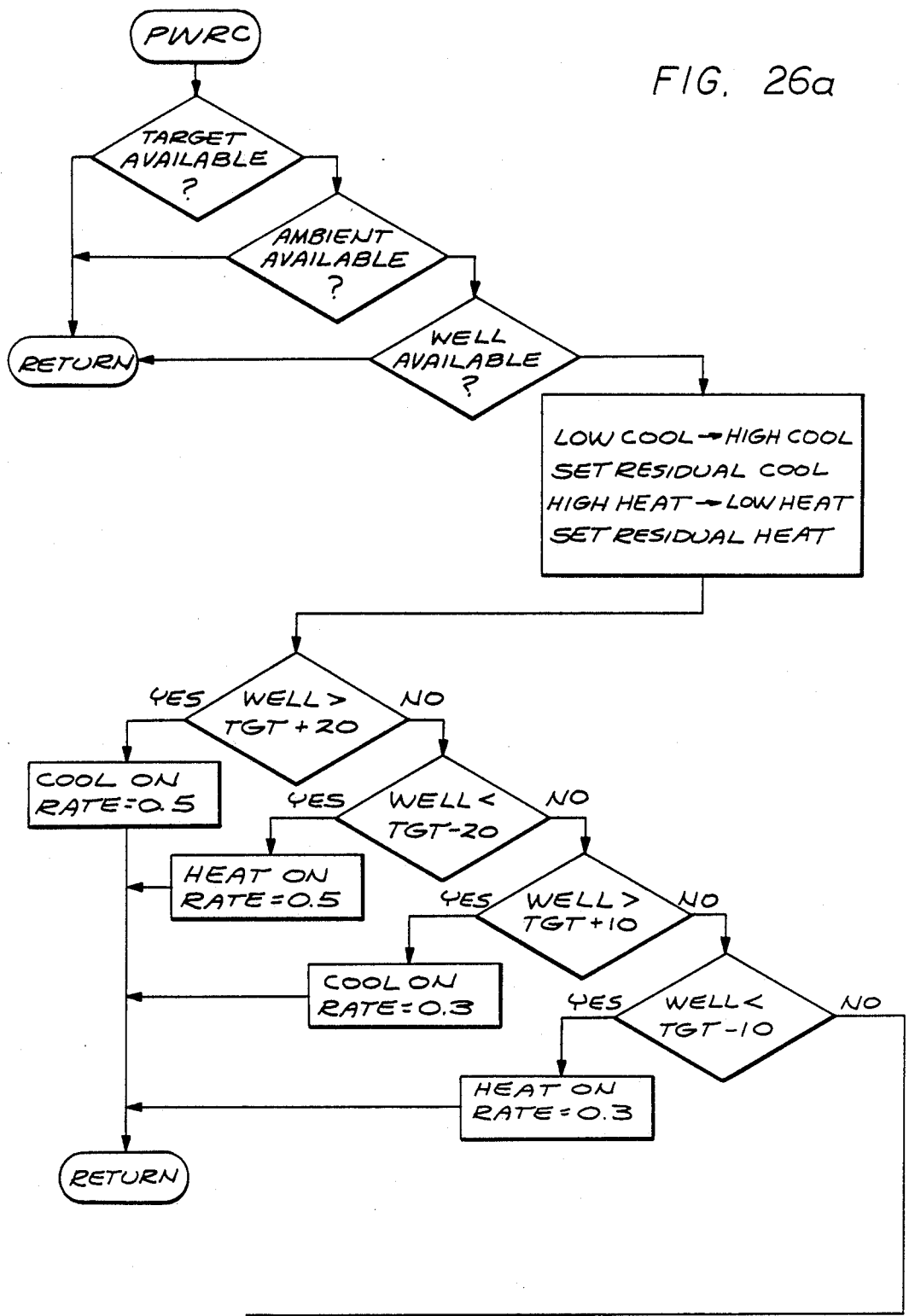
Figure 26B:
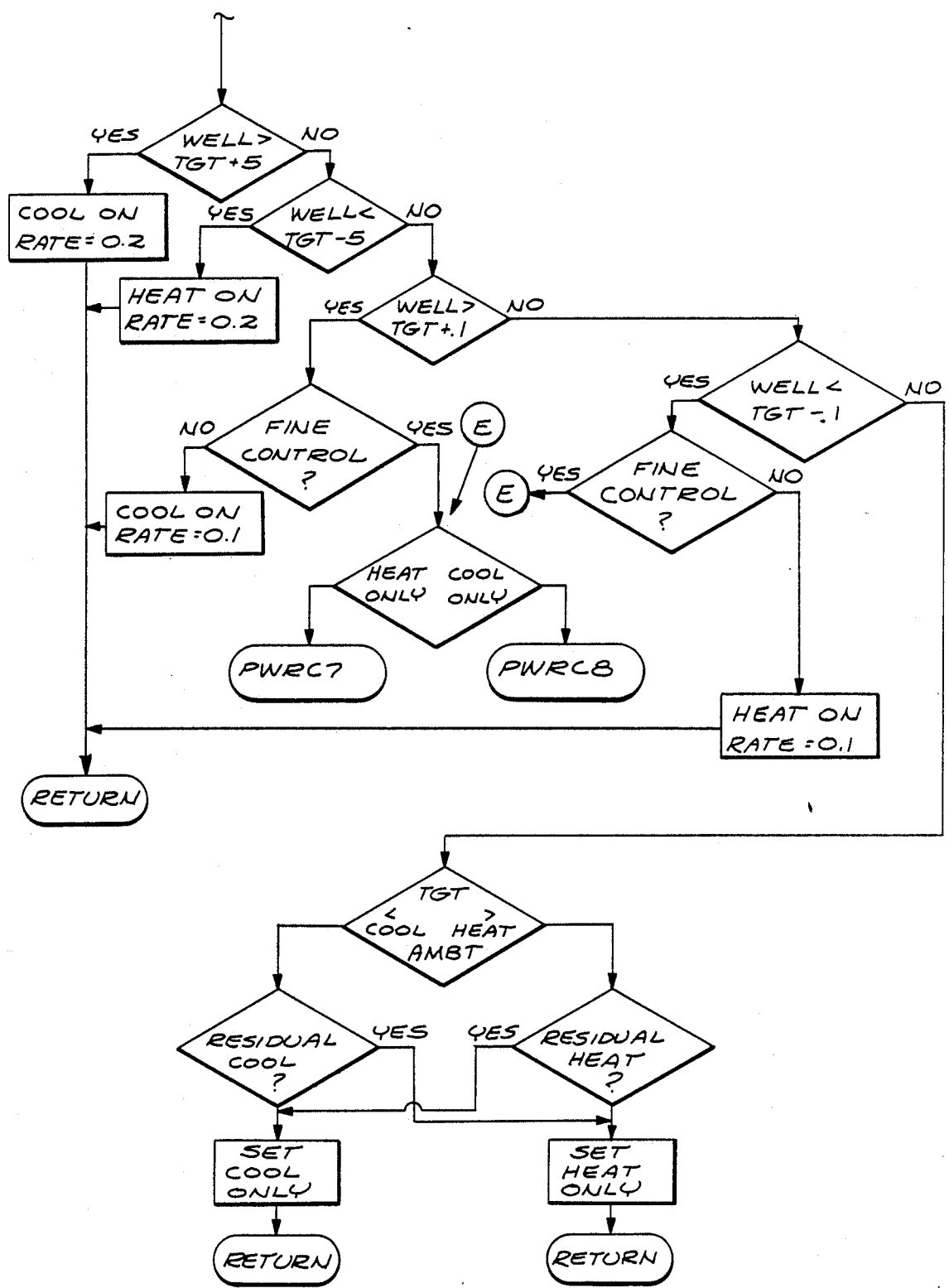
Figure 28:
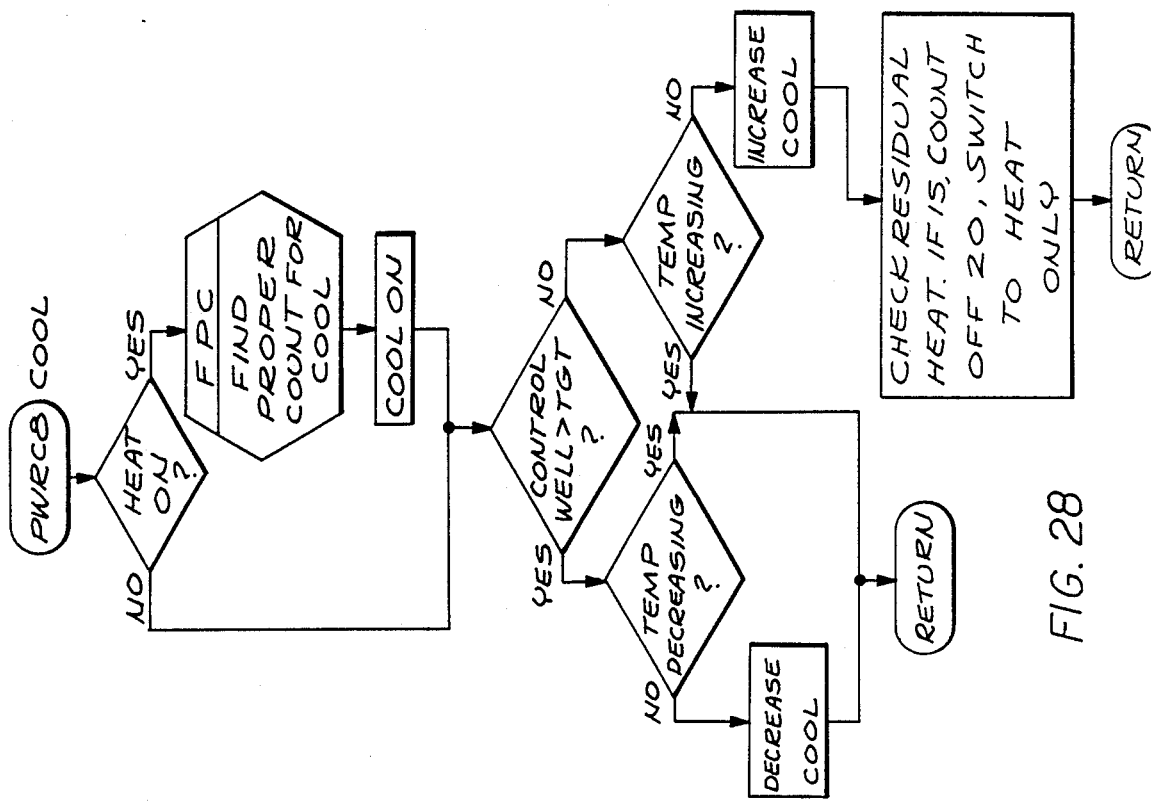
Figure 27:
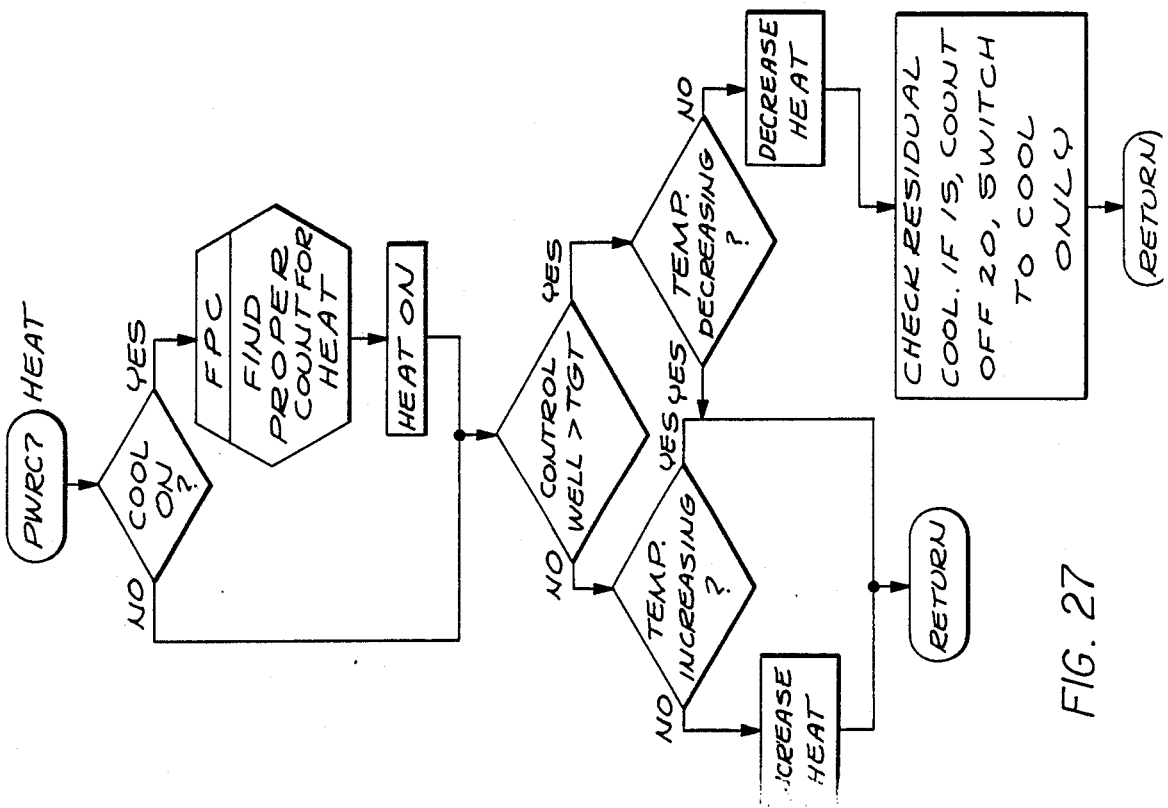
Figures 29, 30:
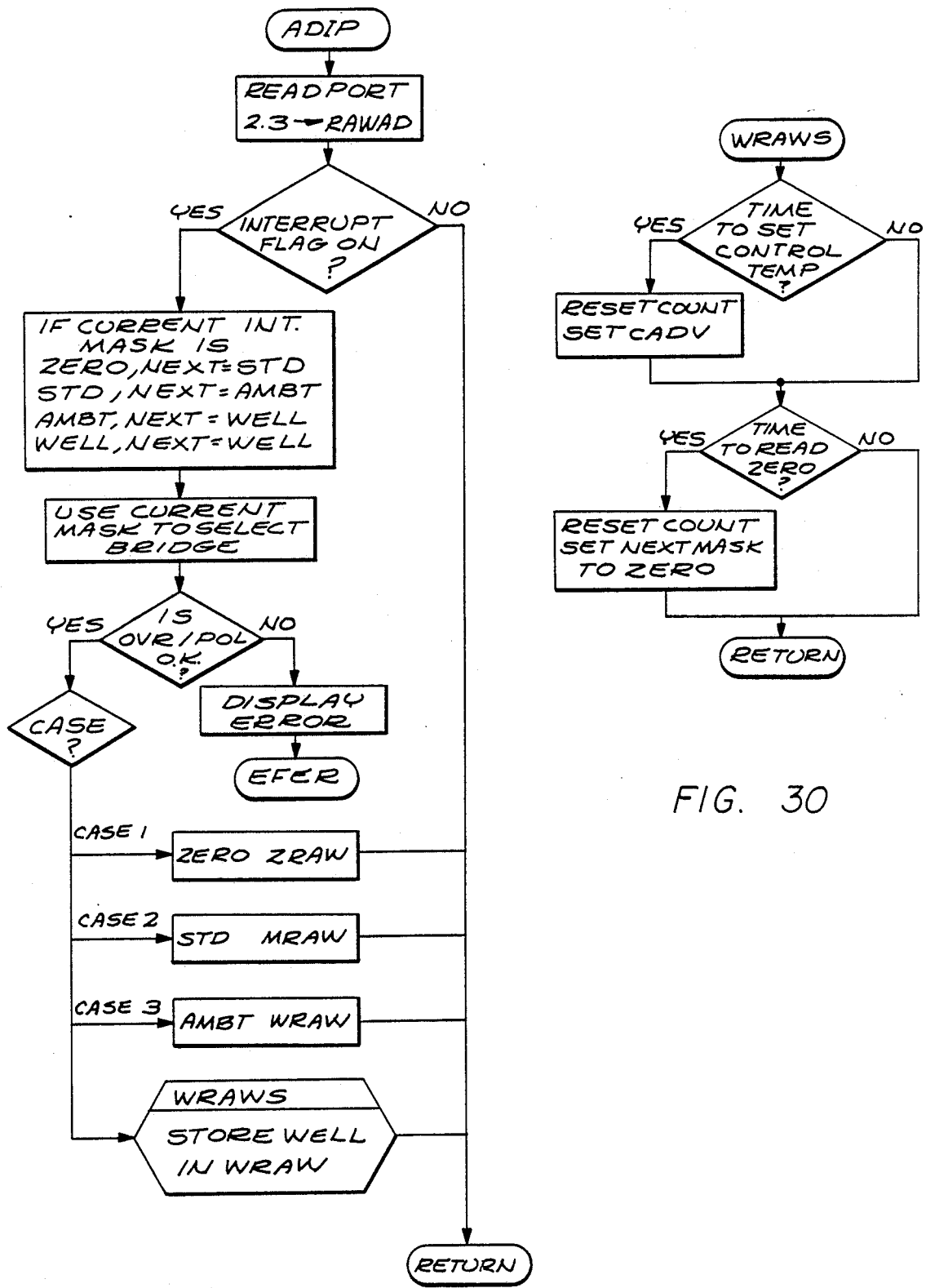

Referring to FIG. 3, a precise voltage is provided at terminals 77, 78 by voltage regulator 79. Resistors 80, 81, 82 are connected in series across terminal 77, 78 to provide an analog ground reference. The junction of resistors 81, 82 is connected to circuit ground, and a potentiometer 83 is connected across resistor 81, 82 to provide a zero adjustment. This is the only ground connection in the divider circuitry.

Resistors 84, 85 are connected in series across the terminals 77, 78 to serve as a standard divider and establish a near full scale reference voltage which is used to detect any minor drift in the voltage measuring circuitry. The temperature sensing resistor 70 on the heat sink 49 is connected in series with a resistor 86 across the terminals 77, 78, to function as an ambient temperature divider. When the temperature of the heat sink changes, this divider circuit provides a corresponding voltage output which is used to correct any error in accuracy resulting from change in room or housing temperature.

The temperature sensing resistor 45 is connected in series with a resistor 87 across the terminals 77, 78 to provide an output voltage corresponding to temperature in the interior of the well, serving as the well temperature divider.

The moving arm of the potentiometer 83 and the junction points in the standard divider, the ambient temperature divider and the well temperature divider are connected to the latch 72 which functions under the control of the processor 62 via the data bus 61 to select one of the three voltages for transmission to the precision amplifier 73. With the divider circuitry of FIG. 3, all the voltage inputs to the latch 72 vary from zero in only one direction, in the plus direction as shown, so that zero crossings and attendant zero-crossing-shift are avoided.

Because the platinum temperature sensing resistors should be operated with relatively low currents to avoid self heating, the maximum output voltage of the divider circuitry is limited. The precision amplifier serves to amplify the output from the latch, typically by an amplification factor of fourteen to one, to provide sufficient voltage to drive the A/D converter 74. The converter functions to convert the analog voltage signal to a digital signal, and may be conventional in design and operation.

The thermo-electric modules 46, 48 are energized from the thermo-electric switching supply 55 through the mode relay 56 and a power transistor 82, with the modules connected in series internally. The power transistor 82 is controlled from the processor 62 through latch 83, optically coupled power driver 84 and power driver 85, with the timer 97 providing a timing input to the driver 84. In the driver 85, the digital signal from the processor is converted to an analog current level for control of the power transistor. The mode relay is controlled from the processor via the latch 83, an optically coupled relay driver 86 and another relay driver 87. The mode relay functions to select the polarity of the DC current to the modules depending on whether heating or cooling is desired. The status of the mode relay and hence of the instrument is indicated by red and green light emitting diodes in status unit 88 positioned on circuit board for viewing by service personnel, with red indicating heating operation and green indicating cooling operation.

Electric power for the electronics is provided by electronic switching supply 91 which provides outputs at five volts DC. A DC-to-DC converter 92 provides plus and minus 15 volts DC for powering amplifiers and converters and providing reference voltages. Another DC-to-DC converter 93 provides voltage for the divider circuitry 71 through the voltage regulator 79. A precision voltage supply 94 provides a reference voltage for the A/D converter 74.

In addition to the coefficient memory 67, a program memory 95 and a RAM memory 96 are connected to the data bus 61. A timer 97 and an IEEE bus controller 98 are also connected to the data bus.

The microprocessor 62 is conventional and typically may be an 8085A microprocessor operating with an eight bit binary code. The processor controls other operations via the eight line data bus and also calculates temperature points utilizing a specific platinum resistance-to-temperature conversion formula. The operation of the processor and related components is set out in the sub-routine flow charts, FIGS. 4-30.

The program memory 95 is a read only memory in which the instructions for the operation of the microprocessor are stored. The RAM memory 96 is a random access memory used for storing temporary information. The coefficient memory 67 is a memory in which are stored the coefficients for the resistance-to-temperature conversion formula, which coefficients are derived during the instrument standardization procedure. These coefficients are stored until the next standardization operation. Each of the memories may be conventional in design and operation.

The timer 97 operates in conjunction with counter 99 and, in the embodiment illustrated comprises three independent sixteenbit counter timers which are programmed for function and count by the processor 62. Timer 0 operates at 1.5 mhz, timer 1 at 97.5 khz, and timer 2 at 200 khz. Timers 0 and 1 are used internally by the microprocessor for timing and safety functions. The output of timer 2 is connected directly to the power driver 84 and furnishes a variable frequency pulse train under control of the microprocessor. This pulse train is translated to power level in the power driver 85.

The IEEE bus controller 98 permits remote control and monitoring of the instrument, when the instrument is connected to a remote controlling device by an IEEE bus cable at connector 40 and the instrument is in the IEEE operation mode. The controller 98 functions to recognize the various commands from the external control device, send out well temperature data, and accept temperature control point information.

An address and decoder unit 100 provides address and decode data to all digital devices in the conventional manner. A timer 101 actuated from the decoder 100 provides control for a beeper 102 to provide audible signals including tone pulses indicating actuation of the keys of key pad 37. A clock 103 provides a standard clock input for the processor 62.

The instrument of the invention has two modes of operation, the NORMAL mode and the CALIBRATION mode. The NORMAL mode is used for ordinary operation in the calibration of a temperature measuring device. The probe, thermometer or other device is inserted into the chamber at the well, the instrument stabilizes at the selected temperature, the temperature indicated by the device is noted and compared with the instrument set temperature.

The CALIBRATION mode is used for maintenance of the instrument itself and has three phases, Calibrate, Standardize and Coefficient Entry. These will be described in greater detail below.

When in the NORMAL mode, the instrument performs the following operations:

Measures at divider 71 the voltage change at the platinum resistor 45 as a function of temperature.

Amplifies and converts this voltage to a binary number at amplifier 73 and A/D converter 74.

Calculates the exact temperature of the resistor 45 using the International Practical Temperature Scale equations of 1968 and the coefficients:
alpha (shape of curve)
delta (curvature of the slope)
Ro (the ice-point resistance of the thermometer).

Displays the calculated well temperature after filtering out any errors caused by power line disturbances and other noise sources.

Determines if the calculated well temperature reading is in agreement with the set point of the instrument and, if not, makes a correction in well temperature by adjusting the thermo-electric module power or mode. This is accomplished by noting the difference between the set temperature and actual calculated well temperature and modifying the power level in a continuous loop.

Monitors and responds to keyboard instructions.

Translates temperature information to the printer when called.

Performs a self-test at power-on.

Converts to ° C. or ° F. before displaying, printing or sending data.

Operates from commands from an IEEE base controller and sends back temperature data.

When in the CALIBRATE mode, Calibration phase, the instrument performs the following operations:

Automatically stabilizes the well at each of five temperature points in succession. For the preferred embodiment disclosed the calibration points are −6° F., 50° F., 120° F., 170° F. and 220° F.

Accepts keyed-in standard thermometer readings of the temperature of the standard thermometer in the well at each of the five points to verify the calibration accuracy of the In the Standardize phase, the instrument performs the following operations:

Automatically stabilizes the well at each of three approximate temperature points in succession: −10° F., 100° F., 220° F. Accepts keyed in readings of the temperature of the standard thermometer in the well at each of the three data points.

Calculates the coefficients which will standardize the unit for NORMAL operation. The coefficients are calculated from these equations (IPTS-68):

$$t_{68} = t' + M(t') \quad (1)$$

$$M(t') = .045 \left(\frac{t'}{100}\right)\left(\frac{t'}{100} - 1\right)\left(\frac{t'}{419.58} - 1\right)\left(\frac{t'}{630.74} - 1\right) \quad (2)$$

$$t' = \frac{1}{\alpha}\left(\frac{R(t')}{R_o} - 1\right) + \delta\left(\frac{t'}{100}\right)\left(\frac{t'}{100} - 1\right) \quad (3)$$

and the bridge equation:

$$R_{t'} = \frac{R_{87}}{\left[\dfrac{E_R}{E_o \dfrac{E_R}{\left(\dfrac{RA}{R82} + 1\right)}}\right]} - 1 \quad (4)$$

where $t_{68}$ is the temperature in degrees Celsius, corrected per IPTS-68;

$t'$ is the temperature of the resistor 45 prior to IPTS-68 correction;

$M(t')$ is the IPTS-68 correction, for temperature above zero degrees Celsius;

$R(t')$ is the resistance of the resistor 45 at the temperature $t'$, prior to IPTS-68 correction; and Ro is the ice-point resistance of the platinum resistor 45;

and the coefficients are alpha, delta and Ro.

Equation (4) is the equation of the bridge circuit of FIG. 3,
where
R87 is the resistance of resistor 87;
RA is the resistance of the set of resistors 80, 81 and 83;
R82 is the resistance of resistor 82;
ER is the voltage across terminals 77, 78; and
EO is the voltage between the junctions 45a and 82a.

Stores these three coefficients in the coefficient memory 67 until the next Standardization operation.

Prints a Standardization record.

In the Coefficient Entry phase, the operator enters the coefficients into the coefficient memory 67.

The operating procedure for the instrument shown in FIGS. 1-3 with the flow charts of FIG. 4-30 is as follows:

Remove the case cover.

Connect a power cord to the receptacle 23 and to an external power source.

Open temperature well doors 34.

Select a chuck 35 of a bore diameter which will accomodate probe 44 of the test item.

Lift chuck 35 from storage rack and insert it into temperature well 33.

Insert probe 44 of test item into bore of chuck 35.

Close temperature well doors 34.

Set the power switch 26 to ON. When the power is turned on, the instrument immediately goes through a self testing procedure. During this test, this message is displayed at the display panel 38: 3605-A SELF TEST VERSION 1.0. Normally the unit will pass self test and go on to present a set of operator instructions. If a failure message is displayed, go to the instrument Inspection, Maintenance, and Trouble Analysis Manual.

After the instrument passes self test, it will ask the operator to select his choice of operating conditions by presenting the following messages at the display panel:

PRINTER DESIRED? 1=YES 2=NO

These messages are self explanatory; pushing key pad 37 #1 will enable the printer 27 and automatically record temperature data.

If the printer has been selected, the unit asks for information which will be included in the printed record:

ENTER DATE-MONTH/DAY/YEAR:
(example: 01 05 87 ENTER)

ENTER THERMOMETER S/N IF ANY:

The test item serial number can be up to 8 digits long.
(example: 87654321 ENTER)

SELECT UNITS. 1=degrees F. 2=degrees C. (example: Press key number 1 and all data will be shown in degrees Fahrenheit.)

ENTER TEST POINT IN °F.
(example: 70.0 ENTER)

The instrument will immediately start changing the well temperature to that required.

After the set point has been entered, both the true temperature of the well and the test point will be displayed.

(example: TRUE TEMP: 72.3° F. TEST POINT: 70° F.)

When the instrument's indicated true temperature is the same as the set temperature, the well has reached approximate stability. The test item indicator must be observed to have reached stability before entering its temperature. Usually, it takes between 5 and 10 minutes after the well has reached stability, for the test item to stabilize. This depends on its mass and materials of which it is made.

After stability of the test item has been reached, it can be calibrated at the given test point. To do this:
Touch the MEAS key
ENTER THERMOMETER READING °F.: will be displayed.
Then the indication of the test item should be
(example: MEAS 73.6 ENTER)
The printer will print:

| example: | THERMOMETER | 73.6° F. |
|---|---|---|
| | TRUE TEMP | 70.0° F. |
| | DEVIATION | 3.6° F. |

After the enter key has been touched, the unit will continue to control the well at the previous setting. In order to enter the next test point, key ADV and the above sequence will be repeated.

The instrument can be controlled remotely. It has an IEEE-488 buss for this purpose, with the connector 40 located on the back of the display housing 39. The IEEE buss control can be called for by:
1. Wait until self test is completed. (PRINTER DESIRED - message will be shown)
2. Key BAK
3. IEEE? 1=YES, 2=NO (is displayed).
4. Key 1

The CALIBRATION mode is used to verify that the instrument is accurate. The unit should be calibrated at specified intervals, normally 6 months to 1 year, depending on the number of hours the instrument is used and how rough it is handled. It is good practice to calibrate it after any repair which might affect its alignment. A precision thermometer is required for calibration.

Select the chuck that fits the thermometer probe smoothly, insert the chuck carefully into the well and then insert the probe carefully into the chuck.

Calibrate Phase Procedure.

The calibration switch 41 is located on the back of the display housing, with access through a small hole on the right rear of the housing. The hole is covered with a seal which must be broken in order to reach the switch. Breaking the seal voids the previous calibration.

After the calibration switch has been actuated, turn the power on. The following message should be displayed:

ENTER MONTH/DAY/YEAR

If this message is not displayed when the power is turned on, the unit is not in the calibration mode.

The following is an example of a typical calibration which is done by following the steps indicated on the instrument display:

| DISPLAY | ACTION |
|---|---|
| ENTER DATE-MONTH/DAY/YEAR: | Enter the day, month and year. (example: 092586 ENTER = September 25, 1986) |
| ENTER 3065-A SERIAL NUMBER: | Enter the serial number of the instrument (example: 9262 ENTER) |
| 1 = CALIBRATE, 2 — STANDARDIZE, 3 = COEF ENTRY | Since calibration is required, 1 is chosen (example: 1) |
| CALIBRATE -ADV- | (example: ADV) |
| SELECT UNITS. 1 = °F., 2 = °C. | (example: 1) Printer will print the following: |
| ****CALIBRATION**** DATE 9/25/86 3605-A SERIAL NO. 9262 TEMPERATURE: °F. STD 3605-A DEV P/F | |
| | The unit will automatically display the following information: |
| TRUE TEMP: 38.17° F. CAL. POINT: −6° F. | |

The temperature in the well proceeds downward towards the first calibration point as indicated (TRUE TEMP). It normally takes several minutes before the TRUE TEMP equals the CAL. POINT temperature. The control system will then maintain the well temperature at the calibration point. It will take another 10 or 15 minutes before the standard thermometer reaches stability. At this time, the measurement is made.

| TRUE TEMP: −6.00° F. CAL. POINT: | −6° F. |
|---|---|
| | The measurement is made as follows: (example: MEAS) |
| ENTER STANDARD TEMPERATURE °F.: | (example: −5.89 ENTER) The printer will then print the following: |
| STD 3605A DEV P/F | |

| | | |
|---|---|---|
| −5.89 | −6.00 | −.11 P |

The printed record shows that the temperature read by the operator from the standard instrument was entered at −5.89° F., that the control thermometer was at −6.00° F. (also the well temperature), the deviation between standard and well was 0.11° F. (the allowable deviation is 0.5° F.), and that the unit passed the test at this point.

The unit will then continue to display the data at this point until ADV is touched.

| | |
|---|---|
| TRUE TEMP: −6.00° F. CAL POINT: | −6° F. (example: ADV) |
| TRUE TEMP: −1.97° F. CAL POINT: | 50°F. |

The well then heads toward the next calibration point. The automatic calibration points are

| | |
|---|---|
| −6.00° F. | (−21.11° C.) |
| 50.00° F. | (10.00° C.) |
| 120.00° F. | (48.89° C.) |
| 170.00° F. | (76.67° C.) |
| 220.00° F. | (104.44° C.) |

After all of the calibration points are measured and recorded by the printer the display returns to the following:

1=CALIBRATE, 2=STANDARDIZE, 3=COEF ENTRY

At this point the instrument has either passed or failed in its calibration test. If the unit passed the calibration test, it is ready for use. Actuate the CAL switch to return the unit to the NORMAL operating mode. Put a calibration seal over the CAL switch hole. The unit is now ready for field use. If the instrument failed the calibration test, go to Standardization Phase Procedure.

Standardization Phase Procedure.

Standardization is a process by which the operator can give the instrument correct temperatures at three points. From these the unit will automatically calculate and store in memory, a new set of temperature coefficients. With these new coefficients the instrument is re-standardized.

Insure that the calibration switch has switched to the CALIBRATION mode.

Switch the unit on.
Follow the steps shown on the display.

The temperature in the well proceeds to the first standardization point. The unit will stabilize the well at the temperature it thinks is −10° F. (example)

TRUE TEMP: −10.67° F. STD. POINT: −10° F.

The TRUE TEMP will probably be different than the STD. POINT temperature after the unit has stabilized. Even though the well temperature appears stable, the standard thermometer may take another 10 to 20 minutes to stabilize. When the standard thermometer has stabilized, touch the measure key. (example: MEAS)

| | |
|---|---|
| ENTER STANDARD TEMPERATURE °F. | |
| | −10.67 ENTER |
| TRUE TEMP: 10.67° F. STD. POINT: | −10° F. |

If the data has been entered satisfactorily touch the ADVANCE key. If the data was not entered correctly, again touch the MEAS key and re-enter the data.

| |
|---|
| ADV |

The well temperature will automatically start towards the next standardization point. There are three standardization points:

| | |
|---|---|
| −10° F. | (−23.33° C.) |
| 100° F. | (37.78° C.) |
| 220° F. | (104.44° C.) |

After the 220° F. data has been entered, and the final advance key touched, the printer will print the following standardization information:

| *** STANDARDIZATION *** | |
|---|---|
| DATE | 9/25/86 |
| 3605-A SERIAL NO. | 9262 |
| TEMPERATURE: | °F. |
| Ro | 200.031623 |
| ALPHA | .003951709 |
| DEL | 1.50377384 |

Standardization is now complete. The unit must now be calibrated as described above under Calibrate Phase Procedure.

Coefficient Entry Phase Procedure.

| DISPLAY | ACTION |
|---|---|
| ENTER DATE-MONTH/DAY/YEAR: | (example: 09 25 86 ENTER) |
| ENTER 3605-A SERIAL NUMBER: | 9262 ENTER |
| 1 = CALIBRATE, 2 = STANDARDIZE, 3 = COEF ENTRY | |
| | 2 |
| STANDARDIZE -ADV- | ADV |
| SELECT UNITS. 1 = °F., 2 = °C. | (example: 1) |
| | At this point the printer prints the following: |
| *** STANDARDIZATION *** | |
| DATE 9/25/86 | |
| 3605-A SERIAL NO. 9262 | |
| TEMPERATURE: °F. | |
| STD 3605-A | |

If for any reason the coefficients have been erased or altered beyond a reasonable amount, the instrument will not Standardize or operate in the NORMAL mode. The unit will display, instead, the failure message, ERROR MAX RESISTANCE. This will probably happen if either the digital circuit board or the coefficient memory has been replaced. The procedure for entering new coefficients is as follows: Actuate the mode switch 41 to CALIBRATION mode. After the calibration switch has been actuated the power is turned on. The following message should be displayed:

| | |
|---|---|
| ENTER DATE-MONTH/DAY/YEAR: | (example: 09 25 86 ENTER) |
| ENTER 3605-A SERIAL NUMBER: | (example: 9262) |
| 1 = CALIBRATE, 2 = STANDARDIZE, 3 = COEF ENTRY | (example: 3) |
| COEF ENTRY -ADVANCE | (example: |
| ENTER $R_o$ | 199.5324 |
| ENTER ALPHA | .0039425875 |
| ENTER DELTA | 1.523897 |
| | ADV) |
| | All previous coefficients will be erased from memory. The unit will now print the following: |
| ** COEFFICIENT ENTRY ** | |
| DATE | 9/25/86 |
| 3605-A SERIAL NO. | 9262 |
| Ro | 200 |
| ALPHA | .00395 |
| DEL | 1.5 |

The coefficients given above were entered and will be close enough to the actual values to standardize any unit.

After the coefficients are entered, the unit will again display:

1=CALIBRATE, 2=STANDARDIZE, 3=COEF ENTRY

The unit now must be standardized following the Standardization Phase Procedure and calibrated following the Calibration Phase Procedure, and the mode switch returned to NORMAL mode and sealed before returning the instrument to the field.

We claim:

1. In an apparatus for providing a desired temperature for use in calibrating a temperature measuring device, the combination of:
   a heat source having a receptacle for receiving the temperature measuring device to be calibrated;
   means for measuring the temperature of said heat source to provide a measured temperature, said means including a temperature sensing resistor having a nonlinear relationship between the temperature and resistance of said resistor;
   means for setting in digital form a desired temperature for the heat source;
   control means for controlling electric power for connection to said heat source for controlling the temperature of said heat source;
   a bridge circuit having four arms and two pairs of terminals, with said temperature sensing resistor connected as one arm thereof and resistors of known resistance connected as the other arms thereof, with a known voltage connected across one pair of bridge terminals and providing a differential voltage at the other pair of bridge terminals, which differential sensing resistor;
   a converter for converting said differential voltage to a digital resistance number;
   a processor having said digital resistance number as an input for calculating the digital temperature of said temperature sensing resistor as a measure of the temperature of said heat source;
   said processor including means for comparing said digital temperature of said temperature sensing resistor and said digital desired temperature to provide a digital temperature error signal; and
   means for converting said digital temperature error signal to an analog signal as an input to said control means for controlling the electric power to said heat source;
   wherein said processor includes means for calculating said digital temperature of said temperature sensing resistor using known equations with three predetermined coefficients, and including
   a coefficient memory for said predetermined coefficients, and
   means for storing values for said coefficients in said memory, and
   wherein said known equations are the IPTS-68 equations.

2. An apparatus as defined in claim 1 wherein said processor includes means for calculating said coefficients having as inputs said digital resistance number and the temperature of a standard temperature measuring device positioned in said heat source receptacle, with the actual temperature of said standard device set in said apparatus by said means for setting a desired temperature, with said calculated coefficients being stored in said coefficient memory.

3. An apparatus as defined in claim 2 wherein said heat source provides heat source temperatures above ambient and below ambient, and said control means includes a temperature mode relay means for switching between a receptacle heating mode and a receptacle cooling mode.

4. An apparatus as defined in claim 3 including:
   a character display having a digital input;
   a printer having a digital input;
   a keypad providing a digital output; and
   a data bus interconnecting said processor, character display, printer and keypad.

5. An apparatus as defined in any of claims 1-4 wherein said processor operates in a first normal mode and in a second calibration mode, and including a manually operated switch for switching said processor between said first and second modes.

6. An apparatus as defined in claim 5 wherein said processor operates in a first calibrate phase, a second standardize phase, and a third coefficient entry phase while in said second calibration mode, with said processor responsive to digital input commands for selecting operation in said first, second and third phases.

7. In a method for providing a desired temperature for use in calibrating a temperature measuring device using an electrically energized heat source with temperature sensing resistor mounted therein, which resistor has a nonlinear relationship between its temperature and its resistance, the steps of:

setting a desired temperature in digital form for the heat source;

measuring the temperature of the heat source and providing a differential voltage which varies with the resistance of the temperature sensing resistor mounted in the heat source;

converting the differential voltage to a digital resistance number;

calculating the digital temperature of the temperature sensing resistor as a measure of the temperature of the heat source using the digital resistance number of the temperature sensing resistor as an input;

comparing the digital temperature of the temperature sensing resistor and the digital desired temperature to provide a digital temperature error signal;

converting the digital temperature error signal to an analog signal;

controlling the electric power to the electrically energized heat source as a function of the analog signal to change the temperature of the heat source and reduce the magnitude of the error signal; and calculating the temperature of the temperature sensing nonlinear resistor using the IPTS equations:

$$t_{68} = t' + M(t') \tag{1}$$

$$M(t') = .045 \left( \frac{t'}{100} \right) \left( \frac{t'}{100} - 1 \right) \left( \frac{t'}{419.58} - 1 \right) \left( \frac{t'}{630.74} - 1 \right) \tag{2}$$

$$t' = \frac{1}{\alpha} \left( \frac{R(t')}{Ro} - 1 \right) + \delta \left( \frac{t'}{100} \right) \left( \frac{t'}{100} - 1 \right) \tag{3}$$

where $t_{68}$ is the temperature in degrees Celsius, corrected per IPTS-68,;

$t'$ is the temperature of the nonlinear resistor prior to IPTS-68 correction;

$M(t')$ is the IPTS-68 corrective, for temperature above zero degrees Celsius;

$R(t')$ is the resistance of the nonlinear resistor at the temperature $t'$, prior to IPTS-68 correction;

Ro is the ice-point resistance of the nonlinear resistor;

alpha is the slope of the curve of resistance vs. temperature of the nonlinear resistor; and rho is the curvature of the slope.

8. The method as defined in claim 7 including measuring the temperature of the heat source by means of a bridge circuit having four arms and two pairs of terminals, with the temperature sensing resistor connected as one arm thereof and resistors of known resistance connected as the other arms thereof, with a known voltage connected across one pair of bridge terminals and providing the differential voltage at the other pair of bridge terminals.

9. The method as defined in claim 7 including;

displaying the digital heat source temperature;

reading the temperature of the device to be calibrated; and comparing the heat source temperature and the device temperature.

10. The method as defined in any of claims 7 and 8 and 9 including:

positioning a standard temperature measuring device in the heat source;

setting the temperature in digital form of the standard temperature measuring device; and comparing the temperature of the standard temperature measuring device and the temperature of the heat source.

11. The method as defined in claim 10 including calculating the digital heat source temperature using known equations with three predetermined coefficients; and storing values for the coefficients in memory.

12. The method as defined in claim 11 including calculating the coefficients utilizing as inputs the digital resistance number of the temperature sensing resistor and the temperature of the standard temperature measuring device positioned in the heat source.

* * * * *